United States Patent
Singh et al.

(10) Patent No.: US 10,728,308 B2
(45) Date of Patent: Jul. 28, 2020

(54) SYSTEMS FOR CONTENT RECOMMENDATION BASED ON A MEETING INVITE

(71) Applicant: AirWatch, LLC, Atlanta, GA (US)

(72) Inventors: Rajiv Singh, Atlanta, GA (US); Lucas Chen, Atlanta, GA (US); Anuj Panwar, Atlanta, GA (US); Joseph Razavian, Atlanta, GA (US); Yugansh Arora, Atlanta, GA (US); Nischit Shetty, Atlanta, GA (US)

(73) Assignee: AirWatch, LLC, Atlanta, GA (US)

( * ) Notice: Subject to any disclaimer, the term of this patent is extended or adjusted under 35 U.S.C. 154(b) by 425 days.

(21) Appl. No.: 14/931,825

(22) Filed: Nov. 3, 2015

(65) Prior Publication Data

US 2017/0126755 A1    May 4, 2017

(51) Int. Cl.
  *H04L 29/08* (2006.01)
  *G06Q 10/10* (2012.01)
  *H04L 29/06* (2006.01)
  *G06F 21/62* (2013.01)

(52) U.S. Cl.
  CPC .............. *H04L 67/06* (2013.01); *G06F 21/62* (2013.01); *G06Q 10/1095* (2013.01); *H04L 63/0442* (2013.01); *H04L 65/1089* (2013.01); *H04L 65/403* (2013.01)

(58) Field of Classification Search
  CPC ............. G06Q 10/1095; G06Q 10/107; G06Q 10/103; H04L 65/4023; G06F 21/62
  See application file for complete search history.

(56) References Cited

U.S. PATENT DOCUMENTS

| | | | | |
|---|---|---|---|---|
| 8,606,517 | B1 * | 12/2013 | Ehrlacher | G08G 1/096811 701/117 |
| 8,887,064 | B1 * | 11/2014 | Oh | G06Q 10/109 715/751 |
| 8,990,329 | B1 * | 3/2015 | Khvostichenko | G06Q 10/1095 709/206 |
| 9,760,399 | B1 * | 9/2017 | Fraser | G06F 9/485 |
| 2003/0142364 | A1 * | 7/2003 | Goldstone | H04L 63/0435 358/402 |
| 2007/0016646 | A1 * | 1/2007 | Tendjoukian | G06Q 10/109 709/206 |
| 2013/0212197 | A1 * | 8/2013 | Karlson | G06Q 10/109 709/206 |
| 2013/0218982 | A1 * | 8/2013 | Hymel | G06Q 10/1093 709/206 |

(Continued)

*Primary Examiner* — Dhairya A Patel
*Assistant Examiner* — Eui H Kim
(74) *Attorney, Agent, or Firm* — Clayton, McKay & Bailey, PC (57) ABSTRACT

Systems herein can recommend files to users based on meeting information. The system can include a secure email gateway that forwards meeting invitations to an email server and a content server. The system can extract invitee information, meeting timing information, and an attachment from the meeting invitation. During a time period based on the meeting timing information, the content server can cause a managed content application on an invitee's user device to visually identify the attachment as a recommended file. This can allow the user to locate and access relevant files for a meeting, including files that are not attached to the meeting invite, at one location.

19 Claims, 6 Drawing Sheets

(56) References Cited

U.S. PATENT DOCUMENTS

| | | | |
|---|---|---|---|
| 2015/0200980 A1* | 7/2015 | Guoxin | H04L 12/1827 |
| | | | 709/203 |
| 2015/0271631 A1* | 9/2015 | Porter | H04W 4/029 |
| | | | 455/456.3 |
| 2015/0319142 A1* | 11/2015 | Herberg | G06Q 10/06 |
| | | | 713/171 |
| 2016/0042324 A1* | 2/2016 | Johnson | H04L 51/18 |
| | | | 705/7.19 |
| 2016/0094500 A1* | 3/2016 | Baca | H04L 51/08 |
| | | | 709/206 |
| 2016/0259761 A1* | 9/2016 | Laborczfalvi | G06F 17/2235 |
| 2017/0017929 A1* | 1/2017 | Masiero | G06Q 10/1095 |
| 2017/0116342 A1* | 4/2017 | Keane | G06F 16/24578 |
| 2017/0124519 A1* | 5/2017 | Hanay | G06Q 10/1095 |

\* cited by examiner

SYSTEMS FOR CONTENT RECOMMENDATION BASED ON A MEETING INVITE

BACKGROUND

Users in an enterprise environment and elsewhere commonly hold teleconferences and online meetings with other users. These are typically scheduled in advance by a calendar invitation sent by email to invited participants.

The meeting organizer can provide files as attachments to the calendar invite for use in the meeting. However, because meetings are often scheduled well in advance, the user can have difficulty finding the attachments in the email inbox and might not even realize the attachments are available.

Current technology offers little assistance to the user in this regard. Instead, it is up to the user to find the calendar invite, open it, and then locate files within the invite. This can be inefficient. The inefficiencies are exacerbated on a mobile user device where screen space is limited. Opening multiple applications, including email, to search for relevant content items can be unwieldy. Even if a user locates a first content item in a calendar invite, they might need to navigate away from the calendar invite to find a second content item in a folder or other application. The first content item might no longer be easily retrievable once the user switches to other applications to retrieve a second content item. Consequently, using a mobile user device to participate in the meeting can involve difficult workflow.

For at least these reasons, a need exists for systems for content recommendation based on a meeting invite.

SUMMARY

An example content recommendation system can include a secure email gateway that communicates with an email server and a content server. When a meeting invite arrives at the secure email gateway (the "SEG"), the SEG can forward the meeting invite to both the content server and an email server. The content server can determine which invitees on the meeting invite are also users of a managed content application. The content application can be an application or plugin used to locate and open files at the content server. The content application can be managed by the content server such that the content application displays available files, such as recommended files, as specified by the content server.

The content server can retrieve attachments and meeting information from the meeting invite, which can be an email or other appropriate electronic communication. Later, at a time based on a meeting start time, the content server can provide the attachments as recommended files in the managed content application for the identified users. This can allow the users to avoid the hassle of finding documents in their email application. Instead, the managed content application can provide the attachments, along with other documents stored by the user.

A system for recommending files can include a SEG that receives electronic messages, including a meeting invitation. The system can also include an email server that receives at least some of the electronic messages from the SEG, including the meeting invitation. The system can further include a content server that securely communicates with the SEG.

The content server can perform stages including receiving meeting information from the SEG. The meeting information can include invitee information, meeting timing information, and an attachment to the meeting invitation. The meeting information can be all or only part of the entire meeting invitation. Meeting timing information can include a start time and end time. The start time and end time can each also indicate a date. The invitee information can include identifying information for a user, such as an email address or phone number.

The content server can further create a notification rule that is used to recommend the attachment at a first user device based on the meeting timing information. A notification rule can include any association of the timing information with an attachment and at least one user. An example notification rule can include storing an attachment identifier, meeting identifier, start time, end time, and user identifier.

The content server can also send a message to the first user device that causes the first user device to visually identify the attachment in a list of recommended files during a time period that is based on the notification rule. In one example, the content server can send the message based on receiving a request for recommended files from a user device. In another example, the content server can send the message based on detecting that the notification rule is satisfied. The notification rule can be satisfied when the current time falls between the start and end time of the notification rule. During this time period, the content server can also send the attachment to the first user device in an example.

It is to be understood that both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
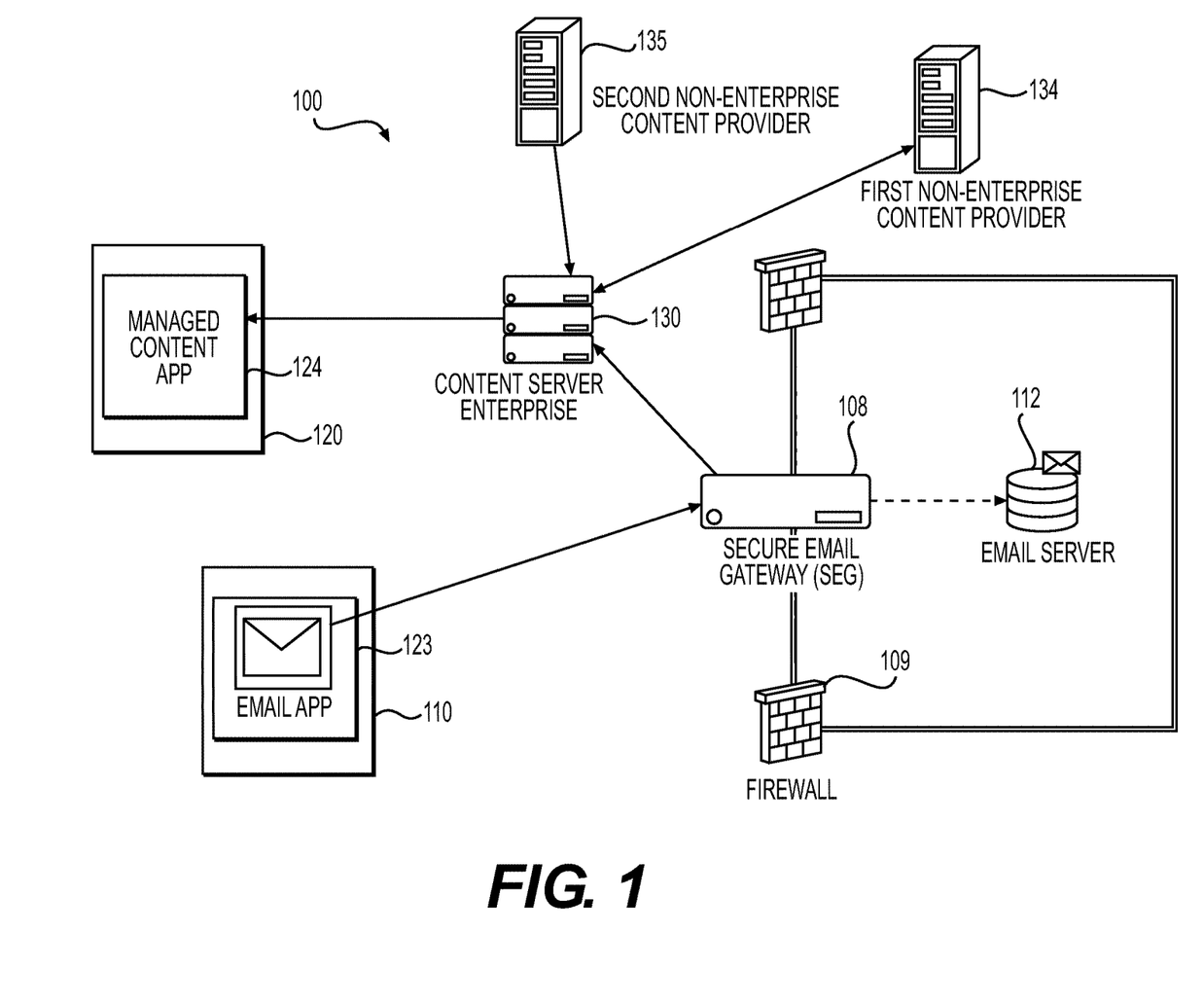
FIG. 1 is an exemplary illustration of system components.

FIG. 1 illustrates an exemplary system 100 for content recommendation based on a meeting invite. The system 100 can include a SEG 108 that can receive and route electronic message traffic. The SEG 108 can serve as a proxy or entry point through an enterprise firewall 109, and can route electronic messages to an email server 112 within the firewall 109. The electronic message traffic can include emails and meeting invites, such as calendar invitations. A meeting invite can be an email in one example. Alternatively, it can be a different object type that is sent to user devices by email address. The term email is used for convenience, and is meant to refer to all suitable electronic message types. The terms meeting invite and meeting invitation are used interchangeably.

The SEG 108 can provide security to the email server 112 and an enterprise network by processing email to defend against malware and spam. If the SEG 108 determines an electronic message should not be blocked, the SEG 108 can send the electronic message (e.g., email) through the firewall 109 to the email server 112. The SEG 108 can further remove sensitive attachments and other information from an email when an email is being sent outside of an enterprise network. The SEG 108 and functionality of SEG 108 can be combined with the email server 112.

In one example, the SEG 108 additionally can securely send a copy of a meeting invite to a content server 130. The content server can identify users that are invited to the meeting (including the meeting organizer), and provide meeting invite attachments as recommended files at times relevant to the meeting. An attachment can be any kind of file, including a word processing file, slideshow, spreadsheet, image, video, or other media.

For the purpose of recommending files, the content server 130 can extract meeting information from the meeting invite. The meeting information can include meeting start and end times, invitee (also called "recipient") information, and file attachments. An invitee includes anyone listed as a potential meeting participant, including the meeting organizer "Invitee" is also used interchangeably with "recipient." Using the invitee information, the content server 130 can identify system users, such as users of the content application 124, that are invited to the meeting. These users can communicate with the content server 130 using a managed content application 124 that can execute on their respective user devices 110 or 120. The content server 130 can store the attachments along with the meeting timing information. The content server 130 can use the meeting timing information to determine when to provide or recommend the attachments to the identified system users.

In one example, the content server can use the meeting timing information to create a notification rule. As used herein, a notification rule can include any association of the timing information with an attachment and at least one user. An example notification rule can include storing an attachment identifier, meeting identifier, start time, end time, and user identifier. This information can allow the content server 130 to determine who to recommend an invite attachment to, and during what time period.

In one example, a process can check multiple notification rules to determine when a meeting is upcoming or ongoing. During that time period, the relevant attachment(s) can be provided as recommended files to the content application 124. The content application 124 can provide a meeting invitee with convenient access to documents relevant to the meeting in conjunction with the meeting time. Once the meeting has ended, the content server 130 can remove the attachments from a recommended file list in the content application 124 or from storage at the content server 130. In some examples, the attachments can be moved from a recommended file list to a recently accessed file list upon conclusion of or shortly after a meeting ends.

In another example, the content server 130 can receive a request from the content application 124 for a list of recommended files. In providing the list, the content server 130 can check the notification rules to determine whether to add meeting attachments to the recommended list. In one example, the content application 124 can request an update to the recommended files list when the user selects an option to display recommended files.

Continuing with the example of FIG. 1, a first user can use a first user device 110 to send a meeting invite to one or more recipients or invitees. One recipient can be a second user that uses a second user device 120. The first user device 110 can execute an email application 123 that sends email though an email server 112. When the first user device 110 sends a meeting invitation or other email, it can be routed to the SEG 108 for processing before reaching the email server 112.

The first user device 110 and second user device 120 can be any computing device, such as a cell phone, laptop, tablet, personal computer, or workstation. Each can include a non-transitory, computer-readable medium containing instructions that are executed by a processor in the user device 110 or 120. Example non-transitory, computer-readable mediums include RAM and ROM, disks, and other memory and storage that is accessible by a USB port, a floppy drive, CD-ROM or DVD-ROM drive, and a flash drive, among others.

As previously mentioned, the content server 130 can store documents for secure retrieval by users. A managed content application 124 executing on a user device 120 can be designed to communicate securely with the content server 130 over a network. The content application 124 on a personal user device 120, such as a cell phone, can allow that user device 120 to access work files in an enterprise environment. In one example, the managed content application 124 can securely download and open files from the content server 130 without intermingling those files with the user's personal content.

In one example, the content application 124 provides a graphical user interface for locating and opening a file. The content application 124 can request and retrieve files from locations provided by the content server 130. In one example, the content application 124 can communicate with or launch other managed applications. For example, opening a file with the content application 124 can cause another managed application, such as a word processor, to launch and display the selected file. When a new or existing file is saved or closed, the content application 124 can send the file to the content server 130 for remote storage and access. To protect sensitive work files, files can also be encrypted and locally decrypted by the content application 124.

The graphical user interface of the content application 124 can include a list of recommended files. The list of recommended files can help a user quickly locate relevant documents, such as documents they have been working on recently. In one example, the content server 130 can include meeting attachments in the recommended files list. A time period for recommending an attachment can be based on a notification rule created from a meeting invite received from the SEG 108. In this way, when a meeting time approaches for a meeting to which the user is invited, the meeting attachments can appear in the user's list of recommended files. This can spare the user from inconveniently searching an email inbox. Once the meeting has ended, the content server 130 can cease recommending the attachments. The content server 130 can also remove the attachments from storage unless otherwise saved by a user.

In one example, the content server 130 notifies the user device 120 of new recommended files based on the content server 130 detecting that a notification rule is satisfied. In another example, the user first requests recommended files. When the user device 120 contacts the content server 130, the content server 130 then analyzes which notification rules are satisfied.

The recommended file list can include content other than invite attachments. For example, the user might have been recently working on a report. The recommended file list can allow a user to quickly see in one location both invite-specific attachments and other files that the user recently worked on. This can save the user time by providing quick access to files that are likely to be relevant to an upcoming or ongoing meeting. This can be particularly helpful on mobile user devices 110 and 120 that have limited screen space.

In one example, the content server 130 and content application 124 can communicate with each other through a management component. This can allow the content server 130 to add meeting-specific documents to the recommended documents list in one example, or notify the user of an upcoming meeting. The management component can execute on a user device 120 or 110 as a stand-alone process or as an integrated part of the content application 124. The management component can include a device-level component, such as an application programming interface ("API"), agent application, hypervisor, or virtualized device. The management component can also include an application-level component, such as an API, SDK, app wrapper, or workspace agent app. The device-level management component can include system level privileges. The application-level management component can include privileges in managed applications, which can be developed for operation with the content server 130. Reference to the management component is understood to include either or both of the device-level and application-level components unless otherwise specified. Additionally, the managed content application 124 can be one of multiple managed applications that execute on the first or second user device 110 or 120 and use the management component.

A backend portion of the management component can execute on the content server 130. This can allow the managed applications of the user device 110 or 120 and the content server 130 to communicate with one another as described above. For example, the content server 130 can notify the content application 124 of recommended files, such as attachments, for an upcoming or ongoing meeting. As another example, based on a permissions control for a portion of a document, the content server 130 can turn functionality on and off within the managed applications through calling subroutines in the management component. If a permission control specifies it, the content server 130 can turn off functionality at the user device 110, such as printing, emailing, or Internet access. This can allow for added security when viewing or editing particularly sensitive documents or portions of a document.

In one example, a scheduling service can execute on the content server 130 to check with the SEG 108 for changes to meeting times. For example, the scheduling service can periodically contact the SEG 108 regarding meetings for which a notification rule exists at the content server 130. In addition or alternatively, the scheduling service can check with the SEG 108 when indicated by the notification rule. If a notification rule indicates that the content server 130 should recommend a meeting attachment in the content application 124 on the second user device 120, the content server 130 can check with the SEG 108 before doing so. If the SEG 108 does not indicate that the meeting time has changed, then the content server 130 can send a content recommendation message to the second user device 120.

The content application 124 can be installed on a user device 120 or 110 from the content server 130, through communications with the management component, for example. Likewise, the content server 130 can utilize the management component to uninstall the content application 124. This can be done, for example, if the user device 120 is lost or if an employee leaves the job. The content server 130 can also use the management component to set permissions within the content application 124. This can include restricting which files the user can open. The content server 130 can, for example, restrict access to certain files by user group. As an example, a sensitive document could be restricted to viewing only by an executive group.

The content server 130 can utilize an internal or external file repository, such as a database, in one example. This can allow a content server 130 to track the versions and locations of files. Files can be stored at the content server 130 or at a separate location. User access to outside file repositories can be governed by group permissions stored at the content server 130. In one example, the content server 130 can provide a list of accessible files for display in the content application 124 on a user device 120 based on the permissions group with which the user is associated.

In another example, the content server 130 can be an enterprise content server that can communicate with non-enterprise content providers 134 and 135. The non-enterprise content providers 134 and 135 can be separate document management systems from the content server 130. The content server 130 can communicate with the non-enterprise content providers 134 and 135 through provider-specific API calls in one example. In this way, the content server 130 can send meeting invites, attachments, or notification rules to non-enterprise content providers 134 and 135 for providing to users of non-enterprise content management solutions.

In one example, the content management server 130 can track which users have accounts with a non-enterprise content provider 134 or 135, which can be a server or cloud-based storage system. When a user is identified as a recipient on a meeting invite, the content management server 130 can make an attachment provision request to a first non-enterprise content provider 134. The attachment provision request can include one or more messages that identify the user and provide meeting information, such as the entire meeting invite. The non-enterprise content provider 134 can then make the attachments available to the user using protocols at the non-enterprise content provider 134. For example, the attachments can be placed in a cloud folder associated with the user's account at the non-enterprise content provider 134 for retrieval by the user. Similar determinations and attachment provision requests can be made when the content server 130 identifies a user as being affiliated with a second non-enterprise content provider 135.

Users can also include links to documents stored by non-enterprise content servers 134, 135. The content enterprise server 130 can identify these links and retrieve the documents from non-enterprise content servers 134, 135 to make them available to user devices 120, 130. The content server 130 can access the non-enterprise servers 134, 135 using application program interfaces (APIs) and, when needed, credentials associated with user accounts. In another example, the content servers 130 provides a link to client devices 120, 130 as recommended content, and client devices 120, 130 retrieve linked content from non-enterprise content servers 120, 130 upon selection of a link by a user.

The network over which files are sent and retrieved can be an enterprise network in one example. The network can include the Internet, a local area network, or any other suitable communication platform. The user device 120 can communicate over the network using one or more modulators, demodulators, multiplexers, demultiplexers, network communication devices, wireless devices, antennas, modems, and any other type of device configured to enable data communication through a communication network.

The content server 130 can include one or more servers and can also be protected by a corporate firewall. Each server can include one or more processors that execute instructions stored on a non-transitory, computer-readable medium. Similarly, the SEG 108, email server 112, first non-enterprise content provider 134, and second non-enterprise content provider 135 can each include one or more servers and processors.

The devices 108, 110, 112, 120, 130, 134, and 135 can each utilize one or more processors. The term "processor," as generally used herein, can refer to any logic processing unit, such as one or more central processing units (CPUs), digital signal processors (DSPs), application specific integrated circuits (ASICs), field programmable gate arrays (FPGAs), and similar devices. The processor can include one or more processors, each configured to execute instructions and process data to perform one or more functions associated with system 100. The processor can be communicatively coupled to a RAM, ROM, storage, database, I/O module, or interface module. A processor can be configured to execute sequences of computer program instructions to perform various processes, which will be described in detail below. The computer program instructions can be loaded into RAM for execution by the processor.

The devices 108, 110, 112, 120, 130, 134, and 135 can also include an I/O module, such as a console with an integrated keyboard and mouse to allow a user to input parameters associated with system 100. An I/O module can also include a display including a graphical user interface (GUI) for outputting information on a screen.

Although an example has been described where the content application 124 and other applications are managed, the applications can also be unmanaged applications. In addition, the management component and content server 130 need not be provided in all examples. For example, the content application 124 executing on the first or second user device 110 or 120 can be developed to include the described management component functionality related to checking a content server 130 or email application 123 for recommended files. In this way, an unmanaged content application 124 can display recommended files.

Figure 2:
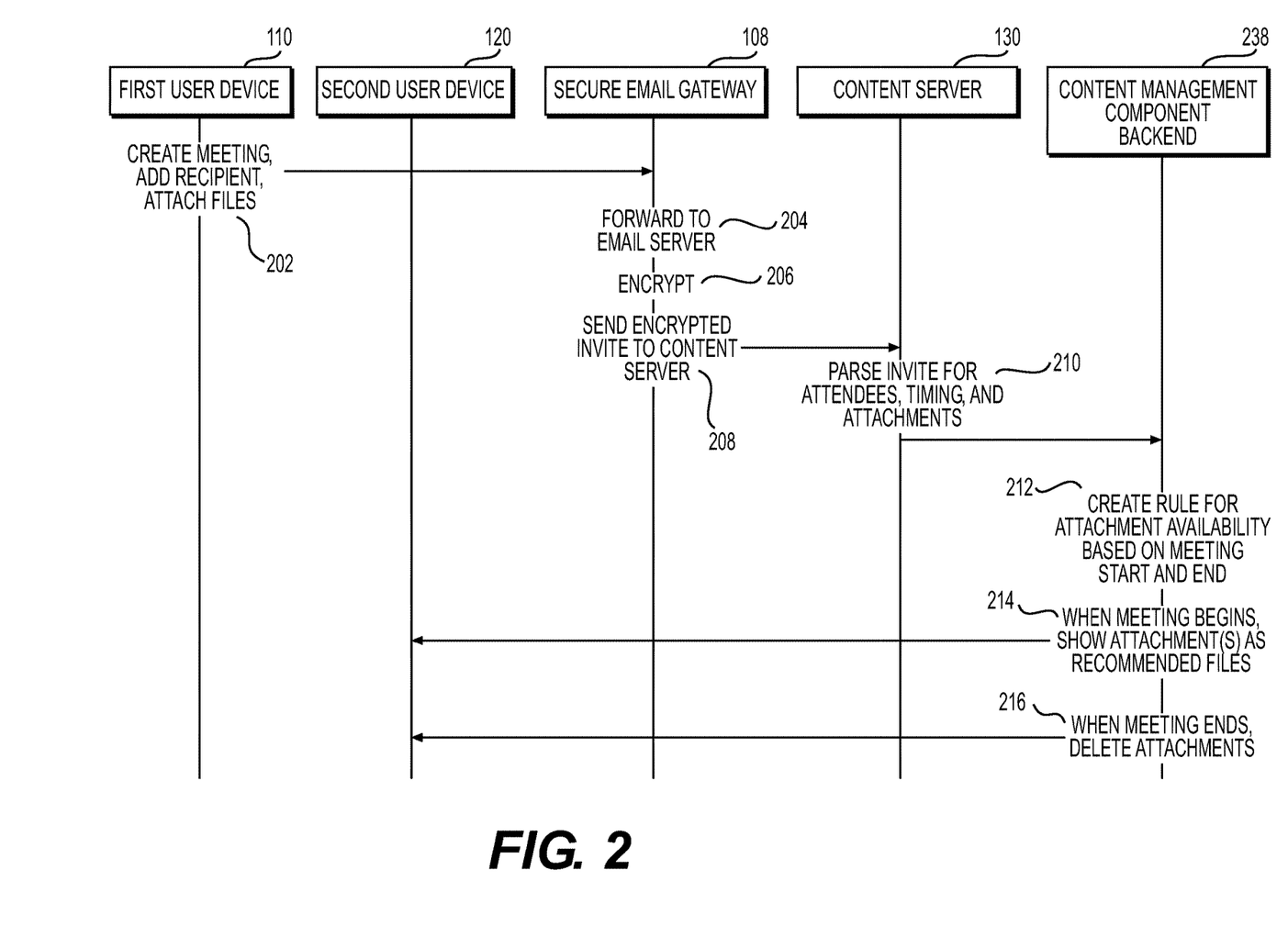
FIGS. 2 and 3 are exemplary methods executed in a system.

FIG. 2 is an exemplary illustration of a method for recommending documents based on a meeting invite. At stage 202, a first user device 110 can create a meeting invite. The first user device 110 can execute an email application 123 that includes functionality for creating and sending a meeting invite. This can include selecting recipients, picking a meeting day and time, and attaching a file relevant to the meeting.

When the email application 123 executing on the first user device 110 sends the meeting invite, it can be routed to the SEG 108. At stage 204, the SEG 108 can forward the email to the email server.

The SEG 108 can also recognize that the email is a meeting invite or relates to a meeting invite, and can route a copy of the meeting invite or meeting information to the content server 130. The SEG 108 and content server 130 can encrypt and decrypt communications between each other. In one example, two key pairs are used for communications, with a separate pair used for each direction of communication. Using the key pairs, the content server 130 and SEG 108 can validate each other's identity, and encrypt and decrypt communications.

A first key pair can allow the content server 130 to validate the identity of the SEG 108. The content server 130 can store its own private key, and issue a public key to the SEG 108 that can be embedded into the SEG 108 during software installation. The content server can receive a request to communicate from the SEG 108 that is signed with the public key that was provided to the SEG 108 from the content server 130. The content server 130 can recognize the request as coming from the SEG 108 by decrypting the public key with the private key at the content server 130.

A second key pair can be used when the content server 130 responds with its own secure signature. The second key pair can include a private key at the SEG 108, with a public key embedded at the content server 130 during software installation. The content server 130 can sign its response with the public key, which the SEG 108 can decrypt with the private key.

At stage 206, the SEG 108 can encrypt an email invite using the public key from the content server 130. Encrypting the email invite can include encrypting the entire meeting invite, including one or more attachments. At stage 208, the SEG 108 can send the encrypted meeting invite to the content server 130.

Although this example refers to sending the entire meeting invite, the SEG 108 can alternatively parse the email invite to extract meeting information. The meeting information can include invitee information, attachments, and meeting timing. Therefore, the SEG 108 can send meeting information, which can include all of the meeting invitation or only a portion of the meeting invitation.

The content server 130 can decrypt, with its private key, the meeting information. Then, at stage 210, the content server 130 can extract from the meeting information the meeting attendees (also called "invitees"), meeting timing information, such as start and end time, and any attachments. This can be done by parsing the email invite in one example. The content server 130 can then compare the meeting attendees against a database or list of enterprise users. This step alternatively can be performed by the SEG 108 in an example.

If the comparison reveals that one or more of the attendees has the content application 124 installed on a user device 120, then at stage 212 the content server 130 can store any attachments and create a notification rule. As stated previously, a notification rule can include any association of the timing information with an attachment and at least one user. In one example, the content server 130 can make the attachments available a fixed time interval, such as 15 minutes, before meeting a start time. The time interval can also be configurable by a user or administrator. The notification rule can also include an end time. After the end time, the content server 130 no longer recommends the attachment in one example. In an example, the notification rule can act as a scheduled event at the content server 130. This can allow the content server 130 to contact the user device 120 when the event occurs. In another example, the notification rule can include one or more database entries that are checked by the content server 130 when determining which files to recommend. For example, the content server 130 can check notification rules, which can be stored in a database, when a recommended document list is requested by the content application 124.

In one example, a management component backend 238 can create the notification rule. The management component backend 238 can be one or more processes that execute on the content server 130 in one example. The management component backend 238 can communicate with the managed content application 124, for example, by communicating with the management component executing on the second user device 120. In this way, the content application 124 can act as a frontend to the backend management component 238.

At stage 214, the content server 130, using the management component backend 238, for example, can detect that a start time in a notification rule has been met and recommend the files or attachments specified in the notification rule. For example, when the meeting start time approaches or occurs, the content server 130 can add the attachments to all attendee user's recommended file lists within the content application 124.

In one example, the content server 130 can receive a request for recommended files from the content application 124 executing on the second user device 120. Based on the notification rule, the content server 130 can then send a list of recommended files, including one or more meeting attachments with satisfied notification rules. In another example, a content management backend 238 process running on the content server 130 can cause a message to be sent to the second user device 120 when a start recommendation time occurs for the one or more attachments. In an example, the management component or content application 124 on the second user device 120 can display a notification on the second user device 120. In one example, the message to the second user device 120 can cause the second user device 120 to contact the content server 130 and retrieve the updated recommendation list.

At stage 216, the content server 130 can determine that the meeting has ended and remove the attachments from the recommended list in an example. In another example, the content server 130 can remove the attachments from storage at the content server.

Figure 3:
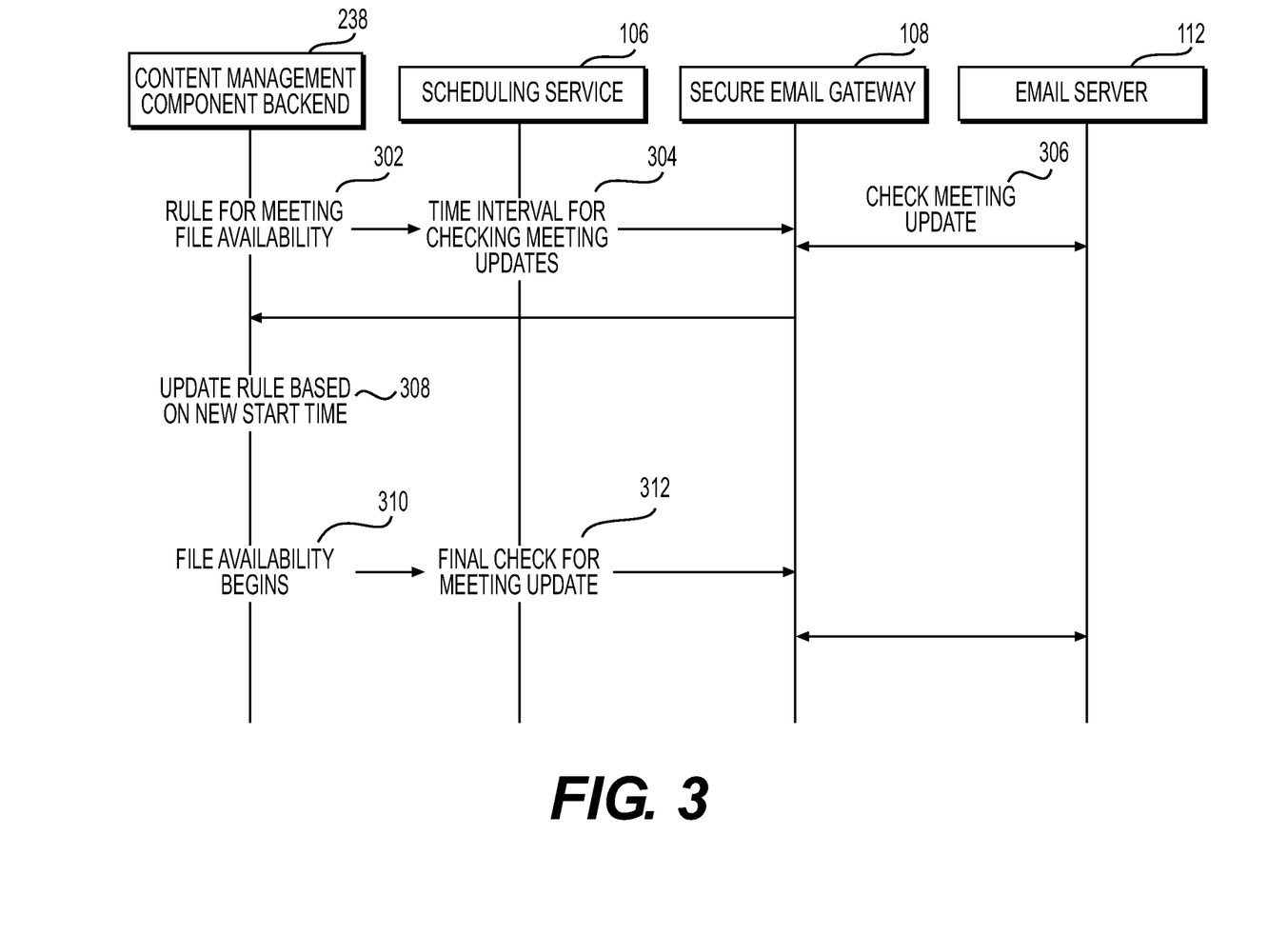

FIG. 3 is an exemplary illustration of a method for checking and updating meeting information at the content server 130. The management component backend 238 and a scheduling service 106 can execute on the content server 130 in an example. Meeting information can need updating, for example, based on a meeting being postponed or canceled. In one example, attendees can decline the meeting. In one example, the notification rule is updated or eliminated so that an attachment is not recommended to a user who has declined the meeting.

At stage 302, the management component backend 238 can create a notification rule used by the content server 130 to determine when a file or attachment will be recommended. The meeting can be added to a list of meetings that are checked by the scheduling service 106.

The scheduling service 106 can periodically check meetings at time intervals in one example. This can help the content server 130 detect meeting changes that the SEG 108 has not already relayed to the content server 130. As an example, an invitee might use a webmail client to communicate directly with the email server 112. In another example, the scheduling service 106 schedules a final meeting check based on a fixed amount of time before a meeting start time. This can help prevent the content server 130 from recommending files that correspond to a meeting that is postponed shortly before the meeting was set to begin. The content server 130 can maintain a database of meetings, notification rules, and times for the scheduling service 106 to check for updates in one example.

At stage 304, the scheduling service 106 can check at a time interval for a meeting update. This can cause the content server 130 to send an update request to the SEG 108. The update request can be encrypted using key pairs between the content server 130 and the SEG 108. In one example, the content server 130 can send a copy of the meeting invite to the SEG 108 for use in identifying the meeting. In another example, the content server 130 can send a meeting identifier to the SEG 108 for the SEG 108 to use in identifying the meeting. The meeting identifier can be an email identifier in one example.

At stage 306, the SEG 108 can request the meeting information from the email server 112. This request can identify the meeting based on the information the SEG 108 received from the content server 130.

If the meeting has changed, the SEG 108 can send the updated meeting invite to the content server 130, such as through the management component backend 238. In one example, if the meeting start time has changed, then the SEG 108 can send the updated meeting invite. In another example, the SEG 108 can send the updated meeting invite if the start time is the same but another aspect of the meeting invite has changed. For example, if an organizer or attendee has updated the meeting invite to include new information or an additional attachment, the SEG 108 can send the updated meeting invite to the content server 130. The SEG 108 can encrypt the updated meeting invite for sending to the content server 130 using the exchanged key pairs, as previously discussed.

At stage 308, the content server 130 can decrypt the updated meeting information and update the notification rule(s) for the meeting. If the updated meeting information includes an additional attachment, the content server 130 can store the additional attachment and include it as a file that will be provided as a recommended file.

At stage 310, the file recommendation and availability time period can begin. The time period can be based on the notification rule. In one example, the content server 130 waits for the content application 124 to request a list of recommended files. For example, the content application 124 can automatically request updates when a user launches the content application 124. Upon receiving the request, the management component backend 238 can determine a list of recommended files that includes the attachment from the satisfied notification rule. In another example, the management component backend 238 contacts the content application 124 based on determining the time period for recommendation has begun. A background service executing on the client application can update a list of recommended files, either through periodic polling or in response to the notifications from the content server 130.

At stage 312, a final check for a meeting update can be performed. This can be initiated by the content management backend 238, the scheduling service 106, or the content application 124 on the user device 120. The final update can be performed at a time that is a fixed amount before the start time of the meeting in an example. The content server 130 can send an update request to the SEG 108 as outlined for stage 304. The SEG 108 can check with the email server 112 and send an updated meeting invite to the content server 130 as outlined for stage 306.

The above stages can help ensure that the correct files are recommended at the correct times even when a meeting is rescheduled. In another example, when a user updates a meeting invite using an email application 123, the updated meeting invite is sent to the SEG 108. The SEG 108 can route the updated meeting invite to the content server 130. In one example, when the content server 130 receives an updated meeting invite, it updates the notification rule corresponding to the meeting. In one example, the content server 130 can also remove the meeting from a list or database of meetings scheduled for update checks by the scheduling service 106. This can reduce the amount of traffic between the content server 130 and the SEG 108 for meetings having updates that are being forwarded to the content server 130 by the SEG 108.

Figure 4:
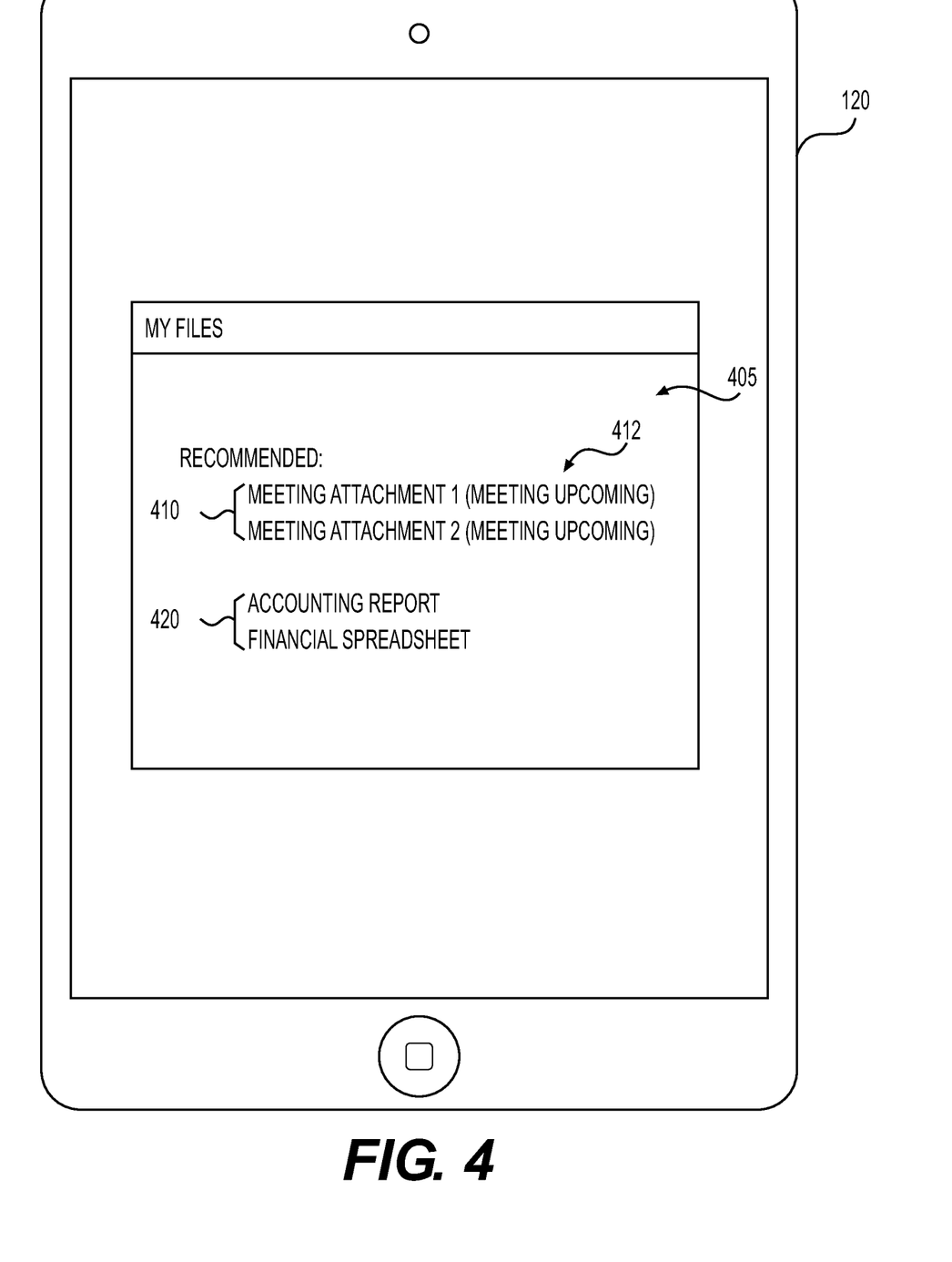
FIG. 4 is an exemplary illustration of a graphical user interface.

FIG. 4 is an exemplary illustration of recommended files 412 being presented on a second user device 120. A content application 124 can list files available for selection by the user on a screen 405 of the user device 120. This can include a list of recommended files 412.

In one example, the content server 130 can cause the content application 124 to place meeting attachments at the top 410 of the recommendation list. Based on the notification rule, the content server 130 can supply first and second meeting attachments as recommended files. The content application 124 can further indicate recommended files that are part of an upcoming meeting. For example, the attachments can display in a different color or have a symbol or text signifying an upcoming or ongoing meeting.

Additional recommended files 420 can also be displayed in the recommended list. These can include documents that the user has worked on recently. In another example, the user can designate a file in the content application 124 to be recommended in conjunction with an upcoming meeting. This can cause the content server 130 to schedule a notification rule for the designated file. This can allow the user to plan for a meeting by making sure that other relevant files will be easy for the user to locate and access.

Figure 5:
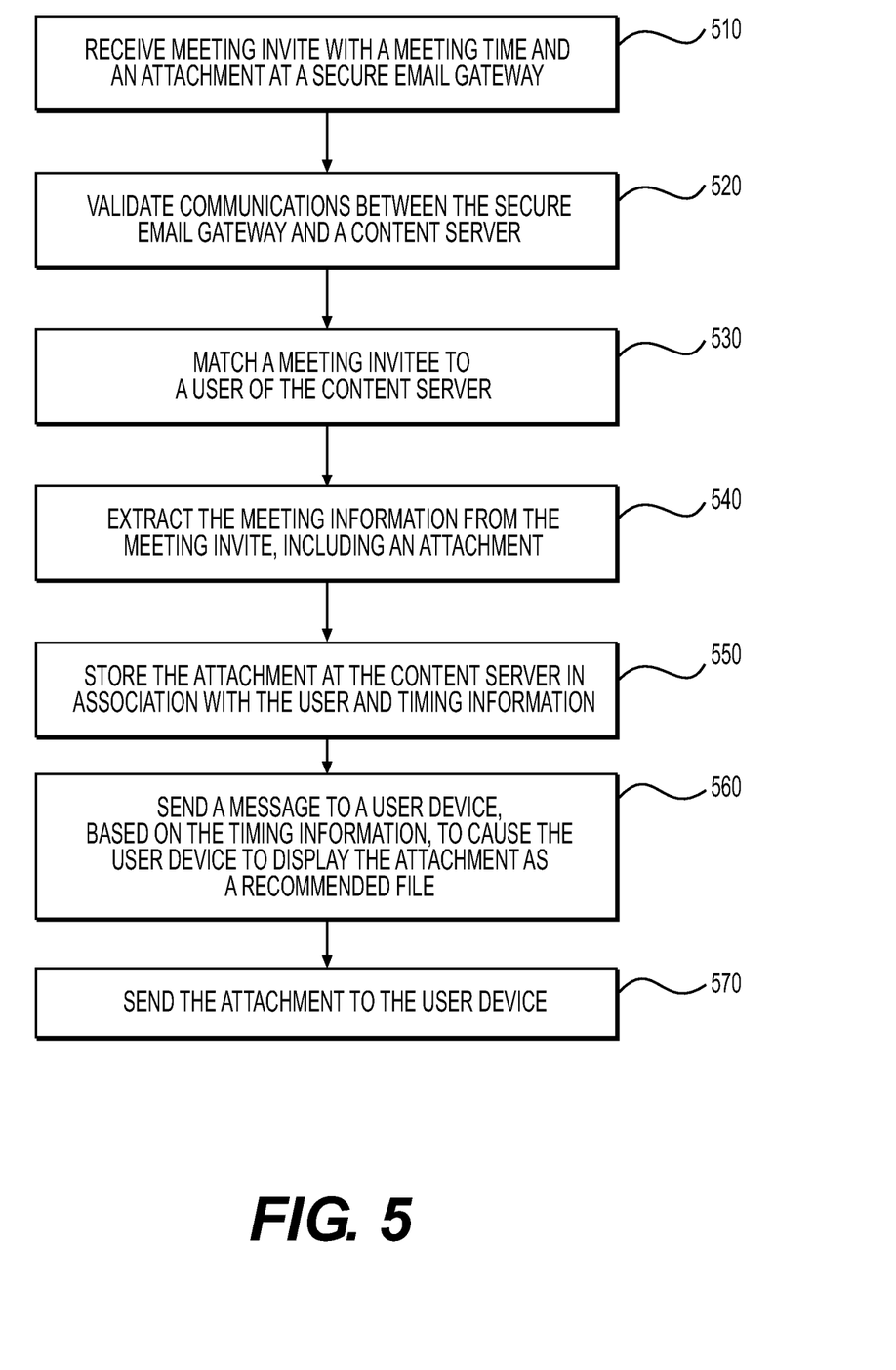
FIG. 5 is an exemplary method executed in a system.

FIG. 5 is an exemplary method that can be performed by a system to recommend files based on a meeting invite. At stage 510, the SEG 108 can receive a meeting invite having an attachment. The meeting invite can originate from a first user device 110. In one example, the meeting invite is an email that the SEG 108 recognizes as a meeting invite. The SEG 108 can determine that that the email is a meeting invite before sending the email to the content server 130. This can be done, for example, by matching the email metadata or content to pre-existing templates that indicate a meeting invite.

At stage 520, the system can validate communications between the SEG 108 and the content server 130. For example, the SEG 108 can encrypt meeting information for sending to the content server 130. As described previously, one way to encrypt the communication is through use of public and private keys. The SEG 108 can have a public key that matches a private key at the content server 130. The content server 130 can have a public key that matches a private key at the SEG 108.

The SEG 108 can send meeting information to the content server 130. The meeting information can be the entire meeting invite in one example. Alternatively, the meeting information can be a subset of information derived from the meeting invite in stage 540.

At stage 530, the system can parse the meeting information (which can include the entire meeting invite) to extract invitee information. Using the invitee information, the content server 130 can check whether an invitee (which can include the meeting originator) is a user of the content server 130. In one example, the content server 130 stores user information, including registered user devices and user email addresses. In an example, the content server 130 can use each invitee's email address to search for a matching user.

If at least one invitee is identified as a user, at stage 540 the content server can extract meeting information from the meeting invite. The meeting information can include a start time, end time, and the attachment. In one example, the meeting information is not extracted and stored until the content server 130 matches a user with an invitee. The attachment can be stored for later recommendation to the one or more matching users.

Stages 530 and 540 can alternatively be performed by the SEG 108. For example, the SEG 108 can parse the invite to determine the invitees. The SEG 108 can compare the invitees against a white-list of users that the SEG 108 receives from the content server 130 or other management server. The white-list can include user information, such as email address or other information that identifies users of the content application 124. If a match exists, the SEG 108 can extract meeting information, such as a start time, end time, and the attachment. The SEG 108 can then send the meeting information to the content server 130.

At stage 550, the content server 130 can store timing information in association with the attachment and the identified user. The timing information can include a start and end time of the meeting or a file recommendation time period. Stored timing information for recommending an attachment is also referred to as a notification rule.

The stored timing information can allow the content server 130 to determine when to recommend the attachment to the user. In one example, the recommendation can be a scheduled event that begins at a scheduled start time. In another example, a process can execute on the content server 130 to determine whether to recommend the attachment based on the timing information or a notification rule. The start time for the recommendation can be the start time of the meeting, or can be a threshold amount of time before the meeting.

At or after the start time for the recommendation, at stage 560 the content server 130 can send a message to the user device 120 associated with the user. The message can cause the user device 120 to display the attachment as a recommended or available file. In one example, the message can cause the user device 120 to retrieve a recommended file list from the content server 130 for display. The recommended file list can be displayed as part of the content application 124.

At stage 570, the content server 130 can send the attachment to the user device 120. This can occur when the user selects to open the file from the content application 124 in one example. Alternatively, the file can be downloaded automatically to the user device 120 during the recommendation period. The content application 124 can remove the attachment from storage once the recommendation period ends.

Figure 6:
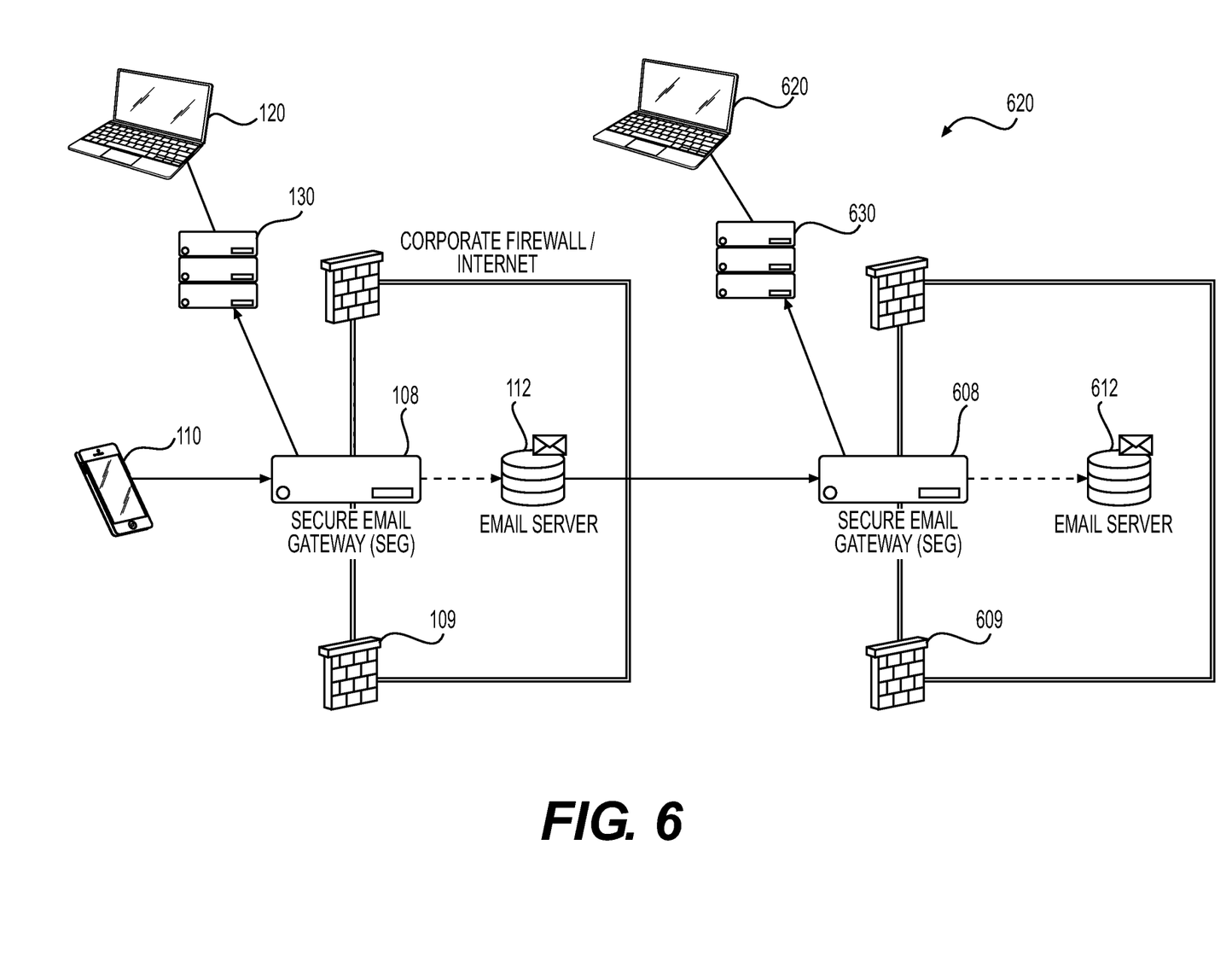
FIG. 6 is an exemplary illustration of system components.

FIG. 6 is an exemplary illustration of a system 600 that utilizes multiple SEGs 108 and 608. Multiple SEGs 108 and 608 can be used, for example, when there are multiple divisions within the same enterprise or domain, between multiple domains, or between multiple enterprises.

A first user device 110 can send a meeting invite that can be routed to the first SEG 108. The first SEG 108 can route the meeting invite (or meeting information from the meeting invite) to the content server 130 as previously described. The SEG 108 can also route the meeting invite to the email server 112.

The email server 112 can determine that one or more of the invitees are at a second domain. The email server 112 can then send the meeting invite to a second email server 612 that is responsible for email traffic to a second domain. The second SEG 608 can preside over email traffic to the second email server 612, acting as a gateway through a second firewall 609. The second SEG 608 can route emails to the second email server 612.

In one example, the second SEG 608 can also detect meeting invites and route them to a second content server 630. The second content server 630 can manage content for a second set of users different than those of the first content server 130. Like the first content server 130, the second content server 630 can communicate with and manage applications on user devices 602 through use of a management component.

In another example, the second SEG 608 can be part of the same domain as the first SEG 108. In that case, the SEG 608 can have connectivity to the first content server 130. The second SEG 608 can route meeting invitations to the first content server 130. To encrypt the communications, the second SEG 608 can have its own private key and a copy of a public key from the content server 130 or 630 with which it communicates.

In the example of FIG. 6, the system 600 can provide recommended content based on a meeting invitation with invitees that span multiple email servers 112 and 612. An email meeting invite can be sent by a first user from the first user device 110. The meeting invite can include second and third users as invitees and can include an attachment. The second and third users can use the second and third user devices 120 and 620, respectively.

The meeting invite can arrive at the first SEG 108 as it makes its way to the first email server 112. The first SEG 108 can send the meeting invite to the first content server 130. The first content server 130 can parse the meeting invite and recognize one of the invitees as the second user. Consequently, the first content server 130 can store the attachment with timing information or a notification rule for when to recommend the attachment to the second user. During that time, the first content server 130 can communicate with the first user device 110 through the content application 124, for example, to provide the recommendation and access to the attachment.

However, in this example, the third user might not be recognized by the content server 130. This could be because the third user does not use the content server 130 or is part of a different division or group.

Nevertheless, the meeting invite can also be routed to the second email server 612 based on the third user's email address. In one example, the first email server 112 can forward the meeting invite to the second SEG 608 presiding over the second email server 612. In another example, a different email server (not pictured) that the first user device 110 communicated with can forward the meeting invite to both the first and second SEGs 108 and 608 based on the different email addresses for the second and third users.

In this example, when the second SEG 608 receives the meeting invite, it can forward the meeting invite to the second content server 630. The second content server 630 can parse the meeting invite and recognize one of the invitees as the third user. Consequently, the second content server 630 can store the attachment with timing information or a notification rule for when to recommend the attachment to the third user. During that time, the first content server 130 can communicate with the third user device 620. The second content server 630 can communicate by making calls to a content application 124 or management component executing on the third user device 620. This can allow the second content server 630 to provide the recommendation and access to the attachment based on the timing information of the meeting.

In this way, the system 600 can provide recommended attachments for a single meeting to different attendees serviced by different email servers 112 and 612 or different content servers 130 or 630. Although not illustrated, contents servers 130 and 630 can also interface with non-enterprise clouds storage providers as previously discussed.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for recommending files, the system comprising:
   a secure email gateway ("SEG") that receives electronic messages, including a meeting invitation, the meeting invitation including invitee information, meeting timing information, and an attachment;
   an email server that receives at least some of the electronic messages from the SEG, including the meeting invitation; and
   a content server of an enterprise, the content server comprising a processor and memory, and providing access to enterprise work files and being separate from the email server, wherein the content server securely communicates with the SEG;
   wherein the SEG performs stages comprising:
      sending the meeting invitation to the email server;
      determining that the meeting invitation includes meeting information that should be sent to the content server, the determination being based on the invitee information of the meeting invitation; and
      sending the meeting information, including the attachment from the meeting invitation, to the content server;
   wherein the content server provides access to the enterprise work files based on authenticating a user associated with the enterprise, the content server performing stages including:
      in an instance where the content server receives the meeting information, creating a notification rule for recommending the attachment within a content application at a first user device, wherein recommendation of the attachment occurs within a timespan based on the meeting timing information;
      sending a message to the first user device that causes the content application to display a list of recommended files during the timespan, the list of recommend files including both the attachment and enterprise work files;
      receiving a request for the attachment based on selection of the attachment at the content application, wherein the content server sets permissions within the content application that restrict which files the user can open; and
      based on the user device having permission to access the attachment, sending the attachment to the first user device, and
   wherein the SEG and the content server encrypt communications between one another using first and second key pairs, wherein the first key pair includes a first private key stored at the SEG and a first public key provided to the content server, the second key pair including a second private key stored at the content server and a second public key provided to the SEG.

2. The system of claim 1, wherein the content server performs further stages including removing the attachment from the list of recommended files based on the notification rule.

3. The system of claim 1, wherein the content server performs further stages including:
comparing the invitee information in the meeting information against user information to identify a first user as a first invitee in the meeting invitation;
determining that the first user device corresponds to the first user; and
in response identifying the first user, storing the attachment and creating a notification rule for recommending the attachment to the first user.

4. The system of claim 3, wherein the content server performs further stages including:
identifying a second user as a second invitee in the meeting invitation, the second user being a member of a non-enterprise content server; and
sending the meeting information to the non-enterprise content server for recommending the attachment to the second user based on the meeting timing information.

5. The system of claim 1, wherein the meeting information sent by the SEG to the content server excludes a portion of the meeting invitation sent to the email server.

6. The system of claim 1, wherein the stages performed by the SEG further comprise:
receiving a white-list of user information from the content server;
locating invitee information in the meeting invitation;
comparing invitee information against the white-list to identify a first user as an invitee in the meeting invitation; and
in response to identifying the first user, sending the meeting information to the content server.

7. The system of claim 1, wherein the content server performs further stages including:
receiving a copy of the meeting invitation that the SEG sent to the email server;
extracting the meeting information from the meeting invitation;
requesting an update to the meeting invitation from the SEG;
receiving additional meeting information from the SEG; and
updating the notification rule based on the additional meeting information.

8. The system of claim 7, wherein the content server requests the update based on a scheduling service that periodically requests updates for multiple meetings at a scheduled time interval.

9. The system of claim 7, wherein the content server requests the update based on the notification rule including a start time that is within a threshold amount of time from occurring.

10. A non-transitory, computer-readable medium containing instructions executed by at least one processor to provide content recommendations, the stages comprising:
receiving a meeting invitation at a secure email gateway ("SEG"), the meeting invitation including invitee information, meeting timing information, and an attachment;
sending the meeting invitation to an email server;
determining, at the SEG, that the meeting invitation includes meeting information that should be sent to a content server, the determination being based on the invitee information of the meeting invitation; and
sending the meeting information from the SEG to a content server, the meeting information including the attachment to the meeting invitation wherein the content server provides a content application of a first user device with access to enterprise work files based on permissions associated with the first user device;
creating a notification rule used by the content server to determine when to recommend the attachment within the content application, the recommendation occurring within a time span that is based on the meeting timing information; and
determining the notification rule is satisfied, and in response, sending a message to a first user device from the content server, wherein the message causes the content application to display a list of recommended files during the timespan, the list of recommend files including both the attachment and enterprise work files;
receiving a request for the attachment based on selection of the attachment at the content application, wherein the content server sets permissions within the content application that restrict which files the user can open; and
based on the user device having permission to access the attachment, sending the attachment from the content server to the first user device,
wherein the SEG and the content server encrypt communications between one another using first and second key pairs, wherein the first key pair includes a first private key stored at the SEG and a first public key provided to the content server, the second key pair including a second private key stored at the content server and a second public key provided to the SEG.

11. The non-transitory, computer-readable medium of claim 10, the stages further comprising removing the attachment from the list of recommended files based on a meeting end time.

12. The non-transitory, computer-readable medium of claim 10, the stages further comprising:
requesting, by the content application, an update to the meeting invitation from the SEG;
receiving additional meeting information from the SEG; and
updating the notification rule based on the additional meeting information.

13. The non-transitory, computer-readable medium of claim 12, wherein the copy of the meeting invitation sent by the SEG to the content server includes the meeting information and excludes a portion of the meeting invitation sent to the email server.

14. The non-transitory, computer-readable medium of claim 12, further comprising parsing the meeting invitation at the content server to extract the first invitee, the meeting timing information, and the attachment.

15. A method for providing content recommendations, comprising:
receiving, at a secure email gateway ("SEG"), a meeting invitation including invitee information, meeting timing information, and an attachment;
sending the meeting invitation to an email server;
determining, at the SEG, that the meeting invitation includes meeting information that should be sent to a content server, the determination being based on the invitee information of the meeting invitation; and
sending the meeting information from the SEG to a content server, the meeting information including the attachment to the meeting invitation wherein the content server provides a content application of a first user device with access to enterprise work files based on permissions associated with the first user device;

creating a notification rule that causes the content server to determine when to recommend the attachment within the content application, the recommendation occurring within a time span that is based on the meeting timing information; and determining that the notification rule is satisfied, and in response, sending a message from the content server to a first user device, wherein the message causes the content application to display a list of recommended files during the timespan, the list of recommend files including both the attachment and enterprise work files;

receiving a request for the attachment based on selection of the attachment at the content application, wherein the content server sets permissions within the content application that restrict which files the user can open; and based on the user device having permission to access the attachment, sending the attachment from the content server to the first user device, wherein the SEG and the content server encrypt communications between one another using first and second key pairs, wherein the first key pair includes a first private key stored at the SEG and a first public key provided to the content server, the second key pair including a second private key stored at the content server and a second public key provided to the SEG.

16. The method of claim 15, further comprising removing the attachment from the list of recommended files based on a meeting end time being past.

17. The method of claim 15, further comprising:
sending an update to the meeting from the SEG to the content server; and
updating the notification rule based on the update.

18. The method of claim 15, further comprising parsing the meeting invitation at the content server to extract the first invitee, the meeting timing information, and the attachment.

19. The method of claim 15, further comprising:
creating a second notification rule used by a second content server to determine when to recommend the attachment to a second user identified in the invitee information,
wherein the second content server receives the meeting invitation from a second secure email gateway.

\* \* \* \* \*